: US009447777B2

United States Patent
Tenberge et al.

(10) Patent No.: US 9,447,777 B2
(45) Date of Patent: Sep. 20, 2016

(54) CONTINUOUS-FLOW POWER INSTALLATION

(75) Inventors: Heinz-Josef Tenberge, Sprockhoevel (DE); Andreas Vath, Leidersbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 471 days.

(21) Appl. No.: 13/140,724

(22) PCT Filed: Nov. 26, 2009

(86) PCT No.: PCT/EP2009/008414
§ 371 (c)(1),
(2), (4) Date: Oct. 24, 2011

(87) PCT Pub. No.: WO2010/078886
PCT Pub. Date: Jul. 15, 2010

(65) Prior Publication Data
US 2012/0274074 A1    Nov. 1, 2012

(30) Foreign Application Priority Data

Dec. 19, 2008 (DE) .......................... 10 2008 063 873
Jan. 26, 2009 (DE) .......................... 10 2009 008 340

(51) Int. Cl.
| F03B 13/00 | (2006.01) |
| F03D 11/04 | (2006.01) |
| F03D 1/00 | (2006.01) |

(52) U.S. Cl.
CPC .............. *F03D 11/04* (2013.01); *F03D 1/001* (2013.01); *F05B 2230/50* (2013.01); *F05B 2230/60* (2013.01); *F05B 2240/14* (2013.01); *F05B 2240/50* (2013.01); *Y02E 10/725* (2013.01); *Y02E 10/728* (2013.01); *Y02P 70/523* (2015.11)

(58) Field of Classification Search
CPC ..... F03D 1/001; F03D 11/04; Y02E 10/728; Y02E 10/725; Y02E 10/72; Y02E 10/722; Y02E 10/70; Y02E 10/726
USPC ..................................... 290/44, 55
See application file for complete search history.

(56) References Cited

U.S. PATENT DOCUMENTS

| 2,655,604 | A | 10/1953 | Hütter |
| 2007/0057517 | A1* | 3/2007 | McNerney ..................... 290/44 |
| 2007/0265133 | A1* | 11/2007 | Smook .................... F03D 11/02 475/317 |
| 2008/0150292 | A1* | 6/2008 | Fedor et al. ..................... 290/55 |
| 2008/0309086 | A1* | 12/2008 | Takaichi ................ F03D 1/001 290/52 |
| 2009/0324410 | A1* | 12/2009 | Omoto ................ F03D 11/0008 416/174 |
| 2010/0019501 | A1* | 1/2010 | Sun ................................ 290/55 |
| 2010/0052325 | A1* | 3/2010 | Perner et al. ................... 290/52 |

FOREIGN PATENT DOCUMENTS

| DE | 1 184 567 | 12/1964 | |
| DE | 296 09 794 U1 | 8/1996 | |
| DE | 296 09 794 U1 | 10/1996 | |
| DE | 102 42 707 B3 | 4/2004 | |
| DE | 10 2004 046 563 B4 | 1/2008 | |
| DE | WO 2008086839 A2 * | 7/2008 | .............. F03B 11/06 |
| EP | 1 045 140 | 10/2000 | |
| EP | 1 184 567 | 3/2002 | |
| EP | 1 243 791 | 9/2002 | |
| JP | WO 2006013722 A1 * | 2/2006 | .............. F03D 1/001 |
| JP | WO 2008029796 A1 * | 3/2008 | .......... F03D 11/0008 |
| WO | 96/11338 | 4/1996 | |
| WO | 02/097265 | 12/2002 | |
| WO | WO 2008028335 A1 * | 3/2008 | |

OTHER PUBLICATIONS

EP 1045140 machine translation.*
EP 1243791 machine translation.*
DE 10 242707 machine translation.*
International Search Report corresponding to PCT Application No. PCT/EP2009/008414, mailed Oct. 21, 2010 (German and English language document) (7 pages).

* cited by examiner

Primary Examiner — Tulsidas C Patel
Assistant Examiner — Viet Nguyen
(74) Attorney, Agent, or Firm — Maginot, Moore & Beck LLP

(57) ABSTRACT

A turbine power plant is disclosed for generating electrical energy from a fluid flow, comprising a gondola rotatably mounted on a pedestal, particularly a tower, comprising a drivetrain, designed for converting the energy applied to the rotor into electrical energy by a rotor driven by the fluid flow and by means of functional components designed for supporting the rotor and/or for supporting the gearbox and/or for converting energy. At least one of the functional components listed above has an operationally fixed connection for transmitting static and dynamic loads from the drivetrain to the tower.

14 Claims, 3 Drawing Sheets

CONTINUOUS-FLOW POWER INSTALLATION

Figure 1:
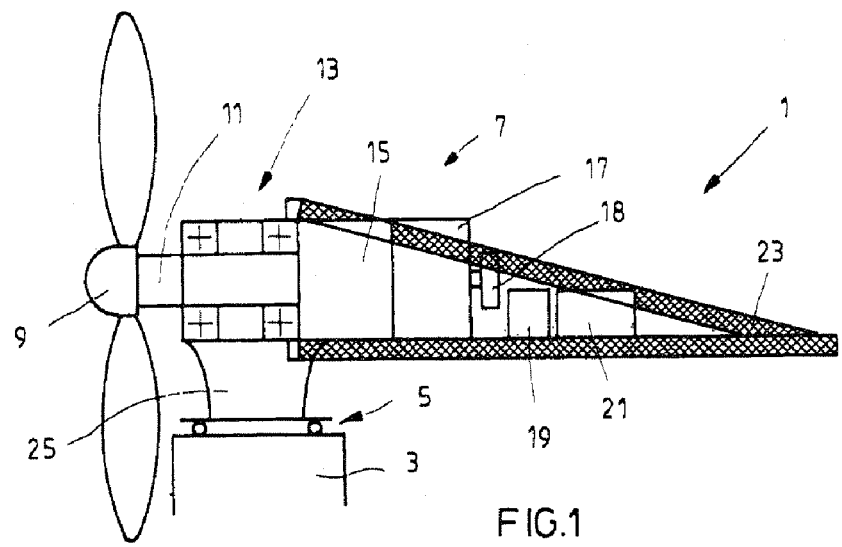

This application is a 35 U.S.C. §371 National Stage Application of PCT/EP2009/008414, filed on Nov. 26, 2009, which claims the benefit of priority to German Application Serial No. DE 10 2008 063 873.0, filed on Dec. 19, 2008 and German Application Serial No. DE 10 2009 008 340.5 filed on Jan. 26, 2009.

BACKGROUND

The present disclosure relates to a continuous-flow power installation for conversion of mechanical energy to a different energy form, preferably electrical energy. The disclosure will be described with reference to a wind energy installation, which converts the energy from an air flow to electrical energy. However, it should be noted that the disclosure can also be used for other types of energy convertors or power installations, for example wave, tide or hydroelectric power installations.

Wind energy installations are known in which a nacelle is mounted on a tower such that it can rotate. A robust support plate or a support frame accommodates the individual components of the drive train—for example rotor bearing, rotor shaft, transmission, generator—and transmits their static and dynamic loads to the tower. The support plate at the same time forms the lower part of the nacelle, which surrounds the drive train in the form of a protective housing. As stated, the support plate is designed to be very robust since, in the case of installation power levels in the Megawatt range, for example, it must support a rotor torque of the order of magnitude of 100 000 Nm or more. This configuration using a support plate is described, for example, in DE 1184567 A2. L-shaped support frames are described, for example, in DE 29609794 U1.

The heavy weight of the support plate and the large amount of space required in the nacelle, which results with the described split configuration of the drive train, are disadvantageous.

Approaches exist for integration of a transmission and generator in a common housing, as is described in DE 10 2004 046 563 B4 or DE 10 242 707 B3. In addition, in some cases, a transmission and the rotor bearing are combined to form a physical unit, for example in EP 11 84 567A2 or WO 1996/011338 A1.

However, concepts such as these have the disadvantage of the increased maintenance effort which results, for example, when an integrated component element is replaced.

SUMMARY

The object of the present disclosure is to specify a continuous-flow power installation whose material consumption and maintenance-friendliness, inter alia, are improved.

This object is achieved by a continuous-flow power installation according to the features set forth below.

The continuous-flow power installation according to the disclosure for production of electrical power from a fluid flow, that is to say a gas flow or a liquid flow, has a nacelle which is mounted such that it can rotate on a base, in particular a tower, and has a drive train which converts the energy introduced at the rotor from the fluid flow to electrical energy by means of a rotor which is driven by the fluid flow and by means of functional components which are designed for bearing the rotor and/or for bearing the transmission and/or for energy conversion.

The special feature is that at least one of said functional components represents an operationally fixed link for the transmission of static and dynamic loads from the drive train to the tower.

A structure which is required in any case therefore has a dual function: for example, a functional component such as a transmission—and its housing—is therefore used both as a functional component and as a supporting element for power introduction and power transmission of static and dynamic loads directly to the tower. Any nacelle structure which may be required can be made lighter owing to the use of the housing structure of a functional component and its mass. The weight of the tower head or nacelle is reduced, or a more robust nacelle is provided, with a comparable mass. The conventional support plate or the conventional support frame can be dispensed with, or can be designed to be considerably lighter.

In the case of large wind power installations, the dynamic loads comprising the wind pressure, the rotor torque to be supported, the thrust load, etc., considerably exceed the static, mass-dependent loads. All the supporting elements, support plates etc. when designed in the conventional manner have very major dimensions. The functional components, such as bearings or transmissions, likewise have to withstand loads in the same order of magnitude, however. The use of the structure of functional components for transmitting or coupling dynamic loads to the tower helps to result in a considerably lighter structure, since less material is required in the force path between the functional component and the tower.

Further advantageous embodiments of the present disclosure are set forth below.

According to one development of the disclosure, the at least one functional component is attached to a supporting ring structure of an azimuth bearing. In particular, the functional components on which the highest, in particular dynamic, loads are to be supported, for example the rotor bearing which predominantly supports the thrust load of the rotor, and the transmission on which the main part of the rotor torque is supported, can be attached to the supporting ring structure of the azimuth bearing. The supporting ring structure can be considered to be part of the azimuth bearing, and its radial circumference does not extend significantly beyond the bearing. It also does not have the extent, in particular horizontally longitudinally stretched, extending over the entire nacelle, which a conventional support plate for accommodation of all the functional components of the drive train has.

The housings of the functional components are preferably used to support the loads on the tower. Further material and weight savings can be achieved if a further functional component is fitted to the housing of a functional component such as this, such that its load is likewise supported via the said housing on the tower.

Furthermore, a comparatively lightweight supporting frame for accommodation of additional components, for example a frequency converter, a transformer, a fire protection installation, control electronics, an emergency power source, a cooling system or an air conditioning system, can be fitted to a housing which is supported on the tower.

If the functional components are designed to be weather-resistant, there is no need for a specific protective housing for the nacelle.

A ring generator can be arranged in a front bearing, on the one hand supports its torque itself or via the front bearing on the tower, and on the other hand absorbs and/or damps a portion of the load and/or power peaks on the input side of the drive train itself. Functional components of the drive train which are arranged downstream, such as a transmission or generator, are thus relieved of load and, if required, may be designed for a reduced overload. This subject matter is considered to be an autonomous disclosure, in conjunction with a wind energy installation, even without the restriction of use of a functional component as a load link to the tower.

The combination of a transmission with a high transmission step-up ratio, for example 1:60 to 1:140 with an asynchronous generator, appears to be advantageous. According to the disclosure, the generator could be attached to the transmission housing, for example without using a support plate. The torque which acts on the generator, is supported on the transmission housing in this case, and is quite low in comparison to the transmission, does not require any significant increase in the weight of the generator housing. In this case, it is also possible to use a synchronous generator instead of an asynchronous generator.

Further advantageous combinations of functional components are a transmission with low to medium step-up ratios and synchronous generators. In the case of transmissions which are in fact physically small, a dimension increase, for example because of a connection of the generator, is actually more important. However, the absence of an additional support plate results in a weight reduction in any case.

BRIEF DESCRIPTION TO THE DRAWING

Figure 2:
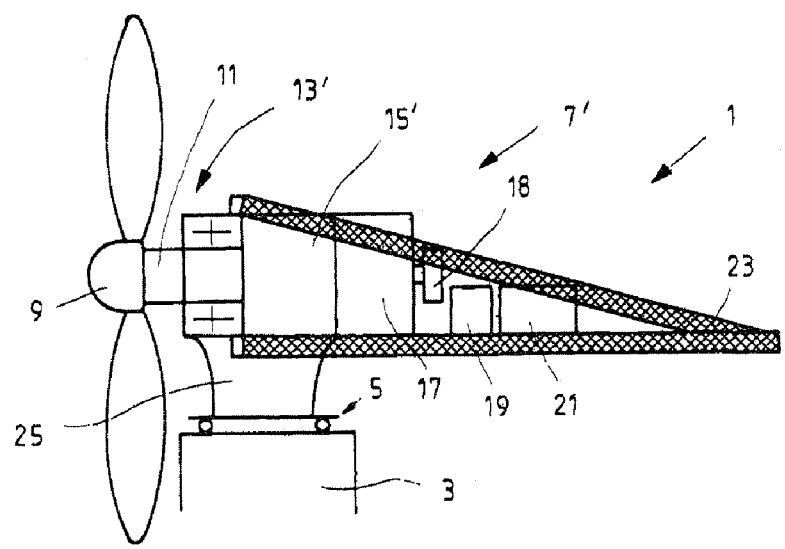
Figure 3:
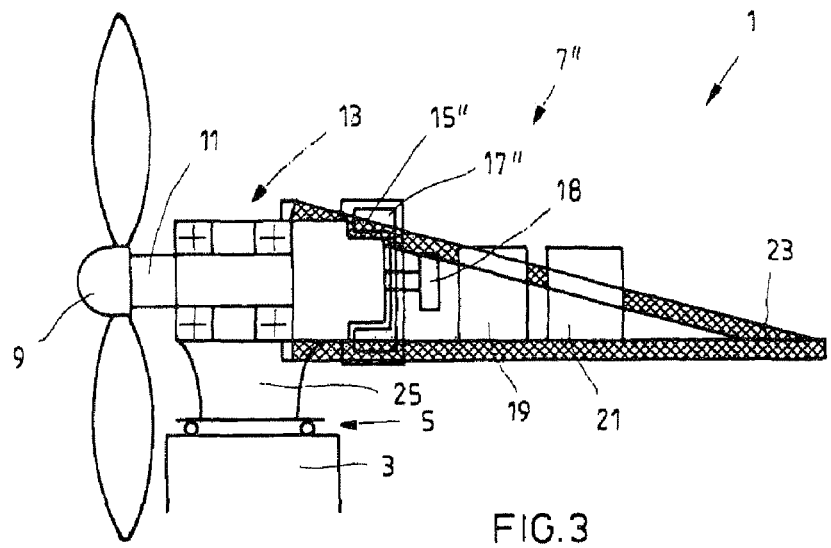
Figure 4:
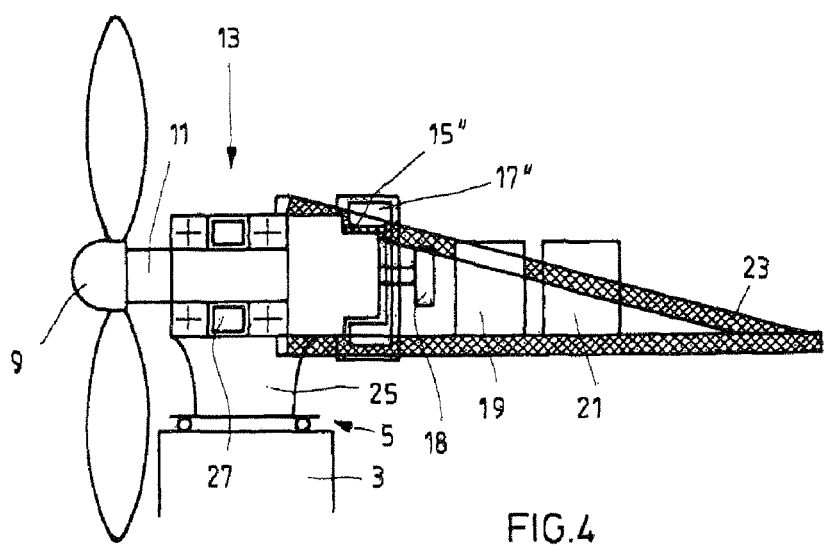
Figure 5:
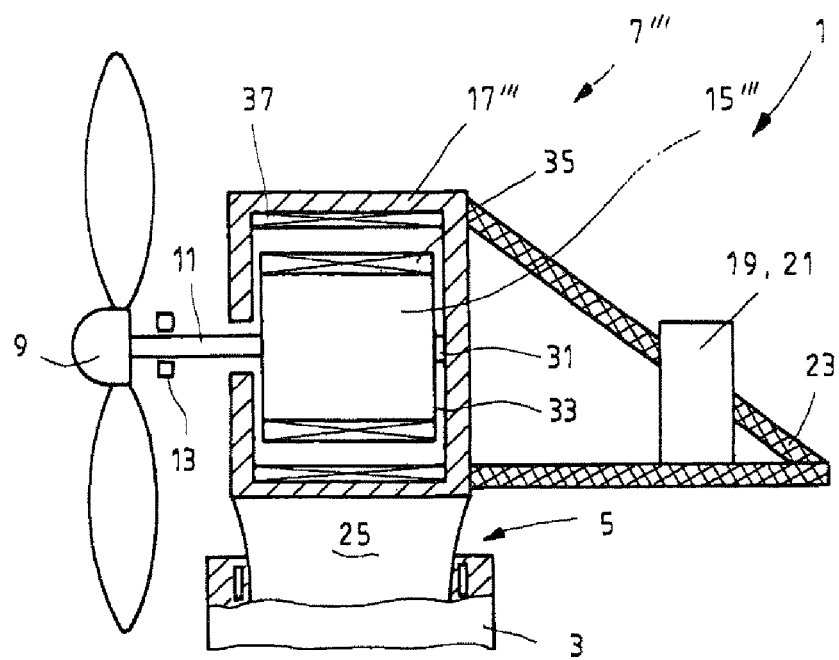
Figure 6A:
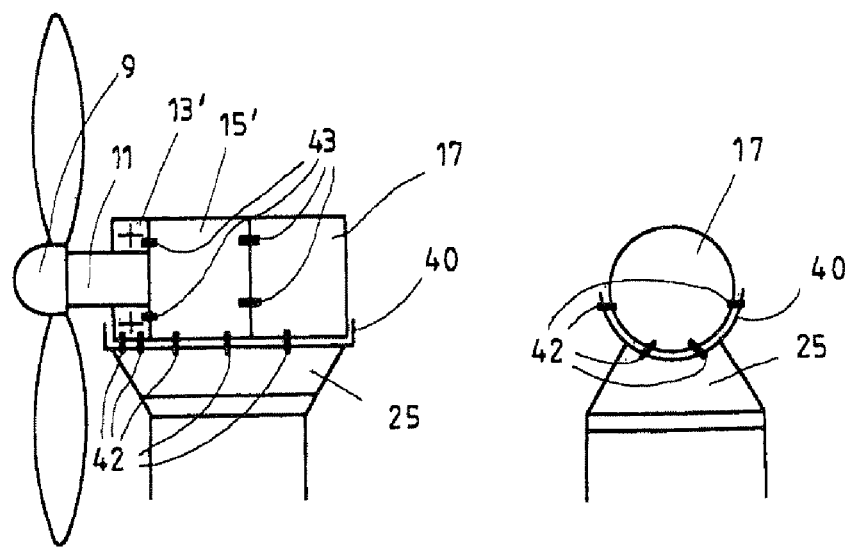
Figure 6B:
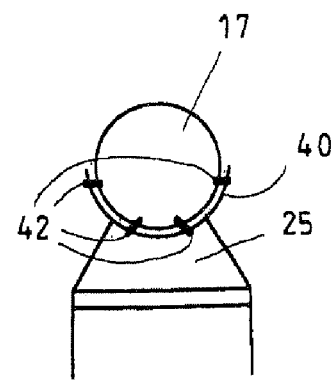

The present disclosure and its advantages will be explained in more detail in the following text with reference to the exemplary embodiments which are illustrated in the figures, in which:

FIG. 1 shows a schematic illustration of a tower head section of a wind energy installation, in which a 2-point rotor bearing is linked to the azimuth bearing of the nacelle or of the drive train, FIG. 2 shows a schematic illustration of a tower head section of a wind energy installation, in which a torque bearing is arranged in front of the transmission, and both the bearing and the transmission are linked to the azimuth bearing of the nacelle and of the drive train, FIG. 3 shows a schematic illustration of a tower head section of a wind energy installation, in which the generator is attached to the transmission, and radially surrounds it, at least on one axial subsection, FIG. 4 shows a schematic illustration of a tower head section of a wind energy installation, in which a generator which is coupled to the rotor shaft without a transmission is provided in a bearing of the rotor, FIG. 5 shows a schematic illustration of a tower head section of a wind energy installation, in which a step-up transmission is integrated in a hollow shaft of the rotor of the generator, with the stationary part of the transmission being supported on the housing or stator of the generator, FIG. 6a shows a schematic side view of a tower head section of a wind energy installation, in which an accommodation shell for functional components of the drive train is provided, and FIG. 6b corresponds to a rear view of the tower head section illustrated in FIG. 6a.

DETAILED DESCRIPTION

In the exemplary embodiments described in the following text, the forces and torques which occur as a result of the wind and of the reaction of the electrical grid system are introduced directly into the tower via the rotor bearing and the azimuth bearing, or via the transmission and the azimuth bearing. One advantage in this case, inter alia, is that, for example, the bearing holder or the bearing shell of the rotor bearing is a part of the nacelle, and the nacelle structure can therefore be simplified, and/or an additional nacelle structure—for example a heavy baseplate—can be dispensed with partially or completely. If the bearing holder is part of the housing structure, then this bearing holder or the bearing itself can expediently be designed such that it is sufficiently stiff with as little use of material as possible. This could be achieved by a cylinder structure or the like for the bearing shell or the bearing, thus providing the latter with a very high area moment of inertia.

One possible embodiment of the bearing for the main shaft is a 2-point bearing, in order to reduce bending torques and axis offset in the transmission to a minimum. Torque bearings or else other forms can be used as a further embodiment of the bearing.

The transmission can be coupled directly to the bearing structure of the main shaft bearing. This should avoid any axis offset. The following embodiments are feasible, inter alia, for the transmission:

1. Machine elements for conversion of torques and rotation speeds in the wider sense in the form of a transmission with a constant or variable step-up ratio of all physical principles of action, for example
2. single-step or multiple-step spur gear transmission
3. single-step or multiple-step epicyclic transmission
4. combinations of 2 and 3
5. differential drive and its derivatives
6. combinations of 2, 3, 5
7. bevel-gear transmission and its derivatives
8. combinations of 2, 3, 5 and 7
9. belt-pulley transmissions
10. combinations of 2, 3, 5, 7 and 9
11. hydrostatic and hydrodynamic transmissions
12. combinations of 2, 3, 5, 9, 11
13. coupling mechanisms
14. combinations of 2, 3, 5, 11, 13
15. epicyclic transmissions
16. combinations of 2, 3, 5, 7, 9, 11, 13, 15
17. electrical transmission as a motor-generator
18. combinations of 2, 3, 5, 7, 9, 11, 13, 15, 17

The generator coupling can vary depending on the transmission and generator variant. If the transmission has only a small number of steps or is physically short, with or without an axis offset, the generator can be in the form of a synchronous generator, an asynchronous generator, or a switch-reluctance generator. In this case, the following types of generator are feasible:

a) for synchronous generator
  1. synchronous generator with external excitation
  2. synchronous generator with permanent magnets, that is to say magnetic excitation
  3. combination of 1 and 2
  4. synchronous generator designed with superconductors
  5. synchronous generator according to 1 to 4, which partially or completely surrounds the transmission
  6. synchronous generator according to 1 to 4, which is partially or entirely integrated in the transmission
  7. synchronous generator according to 1 to 4, which is coupled to the transmission directly or via a coupling
  8. synchronous generator according to 1-7, which is also in the form of a transverse-flux machine 9. synchronous generator according to 1-7, which may be both in the form of an external rotor and internal rotor b) for asynchronous generator
   1. asynchronous generator with a squirrel-cage rotor
   2. asynchronous generator with a winding in the rotor, in the form of a slipring rotor, for the capability to feed the rotor circuit with current and/or voltage c) further generator types
   1. switch-reluctance generator, in widely different embodiments.

FIG. 1 illustrates a first exemplary embodiment. The tower head section of a wind energy installation 1 comprises, inter alia, an azimuth bearing 5 on the upper tower section 3, via which the nacelle 7 and the drive train are mounted on the tower section 3 such that they can rotate. The term nacelle 7 is intended to refer to all the components arranged on the opposite side of the azimuth bearing 5 from the tower, with the exception of the rotor 9.

The output-drive train, which is surrounded by the nacelle 7, comprises as functional components a rotor 9 with rotor blades whose pitch may be variable, a rotor shaft 11 which is mounted such that it can rotate in a rotor bearing 13, a step-up transmission 15, a generator 17 which is connected downstream from the step-up transmission 15, and further auxiliary components such as a frequency converter 19 for controlling the generator 17 and the feed, braking appliances, a hydraulic system, and superordinate control electronics 21, which control the wind energy installation 1.

The rotor bearing 13 is attached to a supporting ring 25 for the azimuth bearing 5. In particular, this transmits thrust and torsion loads as well as static weight forces to the supporting ring 25, and therefore to the tower. The transmission 15 is flange-connected to the rotor bearing 13 or to its housing. Furthermore, the transmission 15 is supported on the supporting ring 25, by which means the high torques which act on the transmission 15 are introduced into the tower. The generator 17 is flange-connected to the transmission housing. In general, this withstands the low torque level which occurs at the generator, without any additional increase in dimensions. A frame-like support structure 23 can be fitted to the housing of the rotor bearing 13, to the transmission housing or to the supporting ring 25, and provides a light-weight mounting platform for the auxiliary components 19 and 21.

The rotor shaft 11 is borne on two points in the rotor bearing 13. The two-point bearing allows at least the static loads from the rotor 9 and rotor shaft 11 to be supported in the rotor bearing 13, thus allowing other components, such as the transmission, to be replaced easily.

The bearings are integrated in or on a structure—see also "housing of the rotor bearing 13"—with as high an area moment of inertia as possible, in order to achieve an adequate stiffness, with little use of material. The bearings which are used may be in the form of ball, cylinder or conical roller bearings, as well as journal bearings. This type of bearing means that the majority of the bending loads from the rotor shaft, which are caused by the wind forces, is not passed into the transmission, resulting in considerable design advantages.

The transmission housing can be connected to the structure of the bearing of the rotor shaft 11 via screws, bolts or other elements which are able to transmit the corresponding forces and torques. The connection of the rotor shaft to the transmission input shaft can be made with the aid of various couplings (rigid or elastic, for example by curved-teeth couplings). The generator shaft can be fitted to the output shaft either directly or via a rigid or elastic coupling, possibly a coupling which damps rotational oscillations. In addition, the housing of the generator can in this case be connected directly to the transmission housing. The purpose of these connections is to cope with the forces and torques which occur between the transmission and the generator. The generator shaft can be designed such that the operating brake and/or holding brake 18, or the braking system, is fitted to it. In order to support the weight force, it is feasible for the transmission and/or the generator also to be supported on a supporting structure which has to be additionally fitted. The operationally fixed connection of the bearing housing, of the transmission and of the generator as well as their linking can be implemented by the described axial connections.

As stated, the support structure 23 can also be fitted for the additional components which are required in a wind energy installation, at the side of and/or behind the drive train, consisting of bearing, transmission, generator and braking system 18. This support structure 23 is thus supported on one or more components of the drive train. FIG. 1 illustrates one possible embodiment of this support.

One possible modification of the illustrated embodiment is for the operating and/or holding brake or braking system to be fitted between the transmission and the generator.

FIG. 2 illustrates a second exemplary embodiment. The wind energy installation 1 according to the second exemplary embodiment corresponds very largely to the wind energy installation 1 according to the first exemplary embodiment. The modifications which are described in the following text from the first exemplary embodiment relate primarily to the mechanical structure and the linking of the components of the drive train of the nacelle 7', in comparison to the nacelle 7.

Instead of a rotor bearing 13 with two axially separated bearing points, a torque bearing 13' is provided, in which the rotor shaft 11 is supported in one bearing point. The torque bearing 13' also supports tilting moments of the rotor shaft 11. The torque bearing 13' is attached to the supporting ring 25. The transmission 15' is likewise attached to the supporting ring 25. It is preferably decoupled from the tilting movements of the rotor shaft 11, for example by means of a universally-jointed connection between the rotor shaft 11 and the input shaft of the transmission 15'. Furthermore, the torque bearing 13' and the transmission 15' are attached to one another.

The generator 17 is once again flange-connected to the transmission housing. The attachment of further components corresponds to that shown in the first exemplary embodiment.

The change to the bearing for the rotor shaft 11 shortens the physical length of the drive train, in comparison to the first exemplary embodiment. This results in a more compact and lighter nacelle overall.

FIG. 3 illustrates a third exemplary embodiment. The wind energy installation 1 according to the third exemplary embodiment corresponds very largely to the wind energy installation 1 according to the first exemplary embodiment. The modifications which are described in the following text from the first exemplary embodiment relate primarily to the mechanical design and the linking of the components of the drive train of the nacelle 7" in comparison to the nacelle 7.

The rotor shaft 11 is supported at two axially separated bearing points in the bearing 13. The bearing 13 is attached to the supporting ring 25. A transmission 15" is connected to the bearing 13 and has the supporting ring 25 connected to it on the one hand, and a housing structure of the bearing 13 on the other hand, in a comparable manner to the first exemplary embodiment. The generator 17" is fitted to the transmission 15" or to its housing, with the stator of the generator 17" being mechanically connected to the transmission housing. The generator 17" is in the form of a ring generator. The free internal area of the generator 17" accommodates a section of the transmission 17". This makes it possible to shorten the physical length of the output-drive train and of the nacelle 7". In order to avoid a complex contact with the rotor of the generator 17", this generator 17" could be designed to use permanent-magnet excitation. However, generator types with hybrid excitation or external excitation in the ring structure are also possible.

The purpose of FIG. 4 is to explain a fourth exemplary embodiment, which is a slight modification to the third exemplary embodiment. According to the fourth exemplary embodiment, a generator 27 which is driven directly by the rotor shaft 11 is provided between the two bearing points in the bearing 13. The generator 27 converts a portion of the mechanical energy introduced at the rotor 9 directly to electrical energy. Only the energy which is not extracted at the generator 27 is introduced into the transmission 15". In addition, the transmission 15" also has to support only a reduced reaction torque, since a portion of the torque which is applied at the rotor 9 is already dissipated by the generator 27.

In order to improve efficiency, it may be worthwhile decoupling the transmission 15" from the generator 27 in the partial load range, in order to avoid losses in the transmission 15" at low power levels, and to increase the life of the transmission 15". A further advantage of this arrangement is the capability to damp drive-train oscillations directly on the rotor shaft 11, by means of the upstream generator 27, by means of a suitable closed-loop control system. In addition, the generator 27 and the generator 17" result in two independent energy conversion systems, which has the advantage that the installation can still be operated, at a reduced power level, if one system fails.

The first and the second exemplary embodiments can, of course, also be modified in the sense of the fourth exemplary embodiment, that is to say a generator which is driven directly by the rotor shaft 11 can also be integrated with the bearing 13 or 13' in the nacelles 7 and 7'.

The purpose of FIG. 5 is to explain a fifth exemplary embodiment. The fifth exemplary embodiment represents a further variant of the exemplary embodiments described above. In the nacelle 7''' of a wind energy installation 1, the transmission 15''' is completely integrated in the housing of a generator 17''', that is to say the housing of the generator 17''' radially and axially surrounds the transmission 15'''. The generator 17''' is attached with its housing to the supporting ring 25 of the azimuth bearing 5. Within the generator housing, a stationary component of the transmission 15''' is attached to the generator housing by means of a shaft 31, or possibly via a hollow shaft. The reaction torque of the transmission 15''' on the generator housing, and therefore on the supporting ring 25, is supported via the stationary shaft 31. However, the stationary component of the transmission can also be supported via a plurality of connecting pins with respect to the generator housing. By way of example, the transmission 15''' is a single-stage epicyclic transmission, which is designed to step up the rotation speed of the rotor shaft 11 by a factor of 6 to 60. In this case, the transmission 15''' has a housing-like or bell-like casing 33, which supports the rotor 35 of the generator 17''', and has the function of the rotor 35. The stator 37 of the generator 17''' is arranged in the generator housing. At the same time, the generator housing may be used as a nacelle housing or as part of the nacelle housing, thus ensuring that the components which are arranged in the transmission housing are protected against the weather. Alternatively, the transmission 15''' may be in the form of a multiple-stage epicyclic transmission.

Furthermore, it is feasible in all the embodiments for the supporting ring 25 to be provided with a form of accommodation shell which can support at least the static weight of the individual functional components. This development of the embodiments described above is illustrated in FIGS. 6a and 6b for the second exemplary embodiment. A torque bearing 13' and a transmission 15' are inserted into the accommodation shell 40. The transmission is followed by the generator 17. The auxiliary components, such as a frequency converter 19 for controlling the generator 17 and the feed, braking appliances, a hydraulic system and superordinate control electronics 21, can also be arranged in the accommodation shell. After the functional components have been inserted into this accommodation shell 40, additional attachment means 42, for example bolts, supports, screws, etc. are used for a connection to the accommodation shell 40 itself, and to the supporting ring 25. In addition, the functional components are attached to one another by attachment means 43. Overall, once said attachment means 42 and 43 have been fitted, this results in a robust unit, which in particular withstands the normal dynamic loads in wind energy installations, between the functional components 13', 15', 17, the accommodation shell 40 and the supporting ring 25. During maintenance and assembly, the accommodation shell 40 simplifies the preliminary arrangement and positioning of the functional components 13', 15' and 17. Since only minor loads occur at the generator 17, it may be sufficient for this to be attached only to the accommodation shell 40 and, possibly, to the transmission 15'. As stated, the accommodation shell 40 can be added for accommodation of the functional components, in all the exemplary embodiments 1 to 5 as described above.

The above description and the figures serve only to improve understanding of the present disclosure, and they do not restrict the disclosure, for example, to the exemplary embodiments or to the described variants. In some cases, the figures have been kept highly schematic, in order to illustrate the methods of operation, the principles of operation, technical refinements and features. In principle, any method of operation, any principle, any technical refinement and any feature which is or are illustrated or described in the figures or in the text can be combined freely and as required with all the claims, any feature in the text and in the other figures, other methods of operation, principles, technical refinements and features which are contained in this disclosure or result from it, as a result of which all feasible combinations of the scope of the disclosure can be added thereto. In this case, combinations between all the individual embodiments in the text, that is to say in every section of the description text, in the claims as well as combinations between different exemplary embodiments in the text, in the claims and in the figures, are also covered.

In addition, the claims do not restrict or limit the disclosure, and therefore the possibilities to combine all the indicated features with one another. All the indicated features are also explicitly covered individually and in combination with all the other features of the invention, by this disclosure.

REFERENCE SYMBOLS

1 Wind energy installation
3 Tower head section
5 Azimuth bearing
7 Nacelle
7' Nacelle
9 Rotor
11 Rotor shaft
13 Rotor bearing
13' Torque bearing
15 Step-up transmission
15' Step-up transmission
15" Step-up transmission
15''' Step-up transmission
17 Generator
17" Ring generator
17''' Generator
18 Braking system
19 Frequency converter
21 Control electronics
23 Support structure
25 Supporting ring
27 Directly driven generator
31 Stationary shaft
33 Casing
35 Rotor of the generator
37 Stator
40 Accommodation shell
42 Attachment means
43 Attachment means

The invention claimed is:

1. A megawatt-class continuous-flow power installation configured to produce electrical power from a fluid flow, comprising:
a base including an azimuth bearing, a supporting ring structure mounted on the azimuth bearing, and an accommodation shell secured on the supporting ring structure;
a rotor driven by the fluid flow: and
a nacelle supported rotatably on the base and including a drive train operably connected to the rotor, the drive train including at least two functional components supported on the supporting ring structure and configured to convert energy introduced at the rotor by the fluid flow to electrical energy,
wherein the accommodation shell is configured to support at least a static weight of the at least two functional components,
wherein the at least two functional components comprise (i) a bearing having a bearing housing, the bearing being configured to rotatably support the rotor or a rotor shaft fixedly connected to the rotor, and (ii) a transmission encased in a transmission housing,
wherein the bearing housing and the transmission housing are secured to the accommodation shell and to each other by attachment means, the attachment means being configured to withstand dynamic loads on the bearing housing and the transmission under normal operating conditions,
wherein the at least two functional components further comprise a generator having a generator housing attached to the transmission housing and to the accommodation shell by the attachment means, the attachment means being configured to withstand dynamic loads which occur on the generator housing under normal operating conditions and to transmit the dynamic loads from the generator housing to the transmission housing and to the accommodation shell, and wherein the accommodation shell has an arcuate shape that is complementary to at least a portion of the generator housing.

2. The continuous-flow power installation as claimed in claim 1, wherein the dynamic loads comprise at least one of the following loads: a thrust load from the bearing, bending moments, a torsion load, a torque about the rotor shaft on an input stage of the transmission, vibration loads, and inertia moments during rotation of the nacelle in order to vary an azimuth alignment of the nacelle.

3. The continuous-flow power installation as claimed in claim 1, wherein each of the transmission housing and the bearing housing is weather-resistant.

4. The continuous-flow power installation as claimed in claim 1, wherein a frame is attached to one of the transmission housing and the bearing housing, the frame being configured to accommodate additional components, which include at least one of a frequency converter, a transformer, a fire protection installation, control electronics, an emergency power source, a cooling system, and an air conditioning system.

5. The continuous-flow power installation as claimed in claim 1, further comprising a ring generator disposed within the bearing housing, the ring generator driven by the rotor without any step-up ratio.

6. The continuous-flow power installation as claimed in claim 5, wherein the ring generator includes a control mechanism configured to damp at least one of torque fluctuations and rotation-speed fluctuations which are introduced from the rotor.

7. The continuous-flow power installation as claimed in claim 1, wherein the transmission is a step-up transmission with a step-up ratio of 1:3 to 1:10.

8. The continuous-flow power installation as claimed in claim 7, wherein the step-up transmission is coupled to a synchronous generator.

9. The continuous-flow power installation as claimed in claim 1, wherein the transmission is a step-up transmission with a step-up ratio of 1:20 to 1:40.

10. The continuous-flow power installation as claimed in claim 1, wherein the transmission is a step-up transmission with a step-up ratio of 1:60 to 1:140.

11. The continuous-flow power installation as claimed in claim 10, wherein the step-up transmission is coupled to a doubly-fed asynchronous generator or to a synchronous generator.

12. The continuous-flow power installation as claimed in claim 1, wherein the transmission and a generator are integrated within the transmission housing such that a reaction torque of the transmission and the generator are supported on the transmission housing.

13. The continuous-flow power installation as claimed in claim 1, wherein at least one auxiliary component is arranged on the accommodation shell along with the at least two functional components, the at least one auxiliary component including at least one of a frequency converter for controlling a generator and a power supply, braking appliances, a hydraulic system, and superordinate control electronics.

14. The continuous-flow power installation as claimed in claim 1, wherein the continuous-flow power installation is one of a wind power installation and a sea-current power installation.

* * * * *